US012749013B2

(12) United States Patent
Lim

(10) Patent No.: US 12,749,013 B2
(45) Date of Patent: Sep. 29, 2026

(54) MACHINE LEARNING TRAINING APPARATUS AND OPERATING METHOD THEREOF

(71) Applicant: LG ENERGY SOLUTION, LTD., Seoul (KR)

(72) Inventor: Bo Mi Lim, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 819 days.

(21) Appl. No.: 18/017,289

(22) PCT Filed: Dec. 8, 2021

(86) PCT No.: PCT/KR2021/018552
§ 371 (c)(1),
(2) Date: Jan. 20, 2023

(87) PCT Pub. No.: WO2022/139263
PCT Pub. Date: Jun. 30, 2022

(65) Prior Publication Data
US 2023/0274185 A1 Aug. 31, 2023

(30) Foreign Application Priority Data
Dec. 23, 2020 (KR) ........................ 10-2020-0182652

(51) Int. Cl.
*G06N 20/00* (2019.01)

(52) U.S. Cl.
CPC .................................... *G06N 20/00* (2019.01)

(58) Field of Classification Search
None
See application file for complete search history.

(56) References Cited

U.S. PATENT DOCUMENTS 5,627,941 A 5/1997 Takahashi et al.
7,096,092 B1 8/2006 Ramakrishnan et al.
(Continued)

FOREIGN PATENT DOCUMENTS

CN 109242133 A 1/2019
CN 109901553 B 9/2020
(Continued)

OTHER PUBLICATIONS

Schmitz, Gregor PJ, Chris Aldrich, and Francois S. Gouws. "ANN-DT: an algorithm for extraction of decision trees from artificial neural networks." IEEE Transactions on Neural Networks 10, No. 6 (1999): 1392-1401. (Year: 1999).*
(Continued)

*Primary Examiner* — Uyen T Le
(74) *Attorney, Agent, or Firm* — Birch, Stewart, Kolasch & Birch, LLP

(57) ABSTRACT

Provided is a machine learning training apparatus including a data managing unit configured to collect new data, a data analyzing unit configured to extract a feature of data used for generation of a machine learning model and a feature of the new data, and a determining unit determining whether a number of pieces of the new data is less than a reference number and determining whether to apply the new data to the machine learning model using different methods according to the number of pieces of the new data.

19 Claims, 6 Drawing Sheets

(56) References Cited

U.S. PATENT DOCUMENTS

| | | | | |
|---|---|---|---|---|
| 2003/0055797 | A1 | 3/2003 | Ishihara | |
| 2016/0071017 | A1* | 3/2016 | Adjaoute | G06Q 20/4016 706/52 |
| 2016/0224724 | A1 | 8/2016 | Zhao et al. | |
| 2017/0294689 | A1 | 10/2017 | Wada et al. | |
| 2018/0144071 | A1 | 5/2018 | Yu et al. | |
| 2018/0276560 | A1 | 9/2018 | Hu et al. | |
| 2018/0285772 | A1* | 10/2018 | Gopalan | G06N 7/01 |
| 2018/0365322 | A1 | 12/2018 | Hou et al. | |
| 2019/0379589 | A1* | 12/2019 | Ryan | G06N 3/084 |
| 2020/0011932 | A1* | 1/2020 | Hooshmand | H01M 10/482 |
| 2020/0076223 | A1* | 3/2020 | Kuriki | B60L 53/14 |
| 2020/0193309 | A1 | 6/2020 | Hazard et al. | |
| 2020/0285706 | A1 | 9/2020 | Singh et al. | |
| 2020/0302234 | A1 | 9/2020 | Walters et al. | |
| 2020/0311595 | A1* | 10/2020 | Chen | G06F 16/22 |
| 2020/0410090 | A1 | 12/2020 | Baker | |
| 2021/0103580 | A1 | 4/2021 | Schierz et al. | |
| 2021/0103930 | A1* | 4/2021 | Fu | G06N 20/00 |
| 2021/0287048 | A1 | 9/2021 | Walters et al. | |
| 2021/0365813 | A1* | 11/2021 | Nakano | G06N 20/00 |
| 2022/0164659 | A1 | 5/2022 | Song | |

FOREIGN PATENT DOCUMENTS

| | | | | |
|---|---|---|---|---|
| CN | 110192874 | B | 9/2020 | |
| CN | 111915004 | A | 11/2020 | |
| JP | 5-81230 | A | 4/1993 | |
| JP | 2003-44830 | A | 2/2003 | |
| JP | 6061713 | B2 | 1/2017 | |
| JP | 3312042 | B2 | 8/2022 | |
| KR | 20160101506 | A * | 8/2016 | G06N 7/01 |
| KR | 10-2005628 | B1 | 7/2019 | |
| KR | 10-2033136 | B1 | 10/2019 | |
| KR | 10-2020-0010624 | A | 1/2020 | |
| KR | 10-2124443 | B1 | 6/2020 | |
| KR | 10-2128056 | B1 | 7/2020 | |
| KR | 10-2020-0115703 | A | 10/2020 | |
| WO | WO 2014/190286 | A2 | 11/2014 | |
| WO | WO 2020/028036 | A1 | 2/2020 | |
| WO | WO 2020/123999 | A1 | 6/2020 | |
| WO | WO 2020/124037 | A1 | 6/2020 | |
| WO | WO-2021046551 | A1 * | 3/2021 | G06N 3/048 |

OTHER PUBLICATIONS

International Search Report (PCT/ISA/210) issued in PCT/KR2021/018552 mailed on Mar. 21, 2022.

Extended European Search Report for European Application No. 21911330.5, dated Jan. 2, 2024.

Ou et al., "Large Margin Distribution Machine Recursive Feature Elimination", The 2017 4th International Conference on Systems and Informatics (ICSAI), IEEE, Nov. 11, 2017, pp. 1518-1523.

Zhang et al., "MUSE: Minimum Uncertainty and Sample Elimination Based Binary Feature Selection", IEEE Transactions on Knowledge and Data Engineering, vol. 31, No. 9, Sep. 1, 2019, pp. 1750-1764.

Chinese Notice of Allowance and Search Report for Chinese Application No. 202180060822.7, dated Jun. 18, 2026, with English translation of Notice of Allowance.

* cited by examiner

MACHINE LEARNING TRAINING APPARATUS AND OPERATING METHOD THEREOF

CROSS REFERENCE TO RELATED APPLICATION

The present application claims priority to Korean Patent Application No. 10-2020-0182652, filed on Dec. 23, 2020, the entire contents of which is incorporated herein for all purposes by this reference.

TECHNICAL FIELD

Embodiments disclosed herein relate to a machine learning training apparatus and an operating method thereof.

BACKGROUND ART

Machine learning refers to a technique for predicting a certain result by training a computer. Generally, result prediction using machine learning includes a process of preparing train data for training a machine and training the computer in a manner suitable for a problem, a process of validating a model with test data, and a process of predicting a result with a model having passed the verification.

A machine learning model is generated using train data selected according to a certain criterion. When trying to predict a result by inputting new data to a machine learning model generated based on selected data, in the case of a low relationship between a feature to be generalized through machine learning and a feature of the new data, an error of the model, apart from the accuracy of the model, increases due to the difference therebetween, degrading the reliability of the model.

DISCLOSURE

Technical Problem

The present disclosure provides a machine learning training apparatus and an operating method thereof, by which an error of a machine learning model may be reduced and a reliability of the machine learning model may be improved.

Technical problems of the embodiments disclosed herein are not limited to the above-described technical problems, and other unmentioned technical problems would be clearly understood by one of ordinary skill in the art from the following description.

Technical Solution

According to an aspect of the present disclosure, there is provided a machine learning training apparatus including a data managing unit configured to collect new data, a data analyzing unit configured to extract a feature of data used for generation of a machine learning model and a feature of the new data, and a determining unit configured to determine whether a number of pieces of the new data is less than a reference number and determine whether to apply the new data to the machine learning model using different methods according to the number of pieces of the new data.

According to an embodiment, when the number of pieces of the new data is less than the reference number, the determining unit determines whether to apply the new data to the machine learning model by performing bounds checking and a trend test with respect to the feature of the new data and the feature of the data used for generation of the machine learning model.

According to an embodiment, the trend test may determine whether a coefficient of an equation obtained from a graph showing a change in the feature of the new data over time falls within a range of a coefficient of an equation obtained from a graph showing a change in the feature of the data used for generation of the machine learning model.

According to an embodiment, the determining unit may apply the new data to training of the machine learning model, when determining that the feature of the new data falls within a trend range of the feature of the data used for generation of the machine learning model as a result of performing the trend test and determining that the feature of the new data falls within a boundary range of the feature of the data used for generation of the machine learning model as a result of performing the bounds checking.

According to an embodiment, the determining unit may perform an F-test and a T-test with respect to the feature of the new data and the feature of the usage data, when the number of pieces of the new data is greater than or equal to the reference number.

According to an embodiment, the determining unit excludes the new data from training of the machine learning model, when a result value obtained by performing the F-test and a result value obtained by performing the T-test are greater than or equal to a threshold value.

According to an embodiment, the determining unit may determine whether to apply the new data to the machine learning model by performing bounds checking and a trend test with respect to the feature of the new data and the feature of the data used for generation of the machine learning model, when a result value obtained by performing the F-test and the T-test is less than a threshold value.

According to an embodiment, the determining unit may apply the new data to training of the machine learning model, when determining that the feature of the new data falls within a trend range of the feature of the data used for generation of the machine learning model as a result of performing the trend test and determining that the feature of the new data falls within a boundary range of the feature of the data used for generation of the machine learning model as a result of performing the bounds checking.

According to an embodiment, the machine learning training apparatus may further include a machine learning model training unit configured to train the machine learning model by applying the new data to the machine learning model based on a determination result of the determining unit.

According to another aspect of the present disclosure, there is provided an operating method of a machine learning training apparatus, the operating method including collecting new data, extracting a feature of data used for generation of a machine learning model and a feature of the new data, determining whether a number of pieces of the new data is less than a reference number, and determining whether to apply the new data to the machine learning model using different methods according to the number of pieces of the new data.

According to an embodiment, the determining of whether to apply the new data to the machine learning model using different methods according to the number of pieces of the new data may include, when the number of pieces of the new data is less than the reference number, determining whether to apply the new data to the machine learning model by performing bounds checking and a trend test with respect to the feature of the new data and the feature of the data used for generation of the machine learning model.

According to an embodiment, the determining of whether to apply the new data to the machine learning model using different methods according to the number of pieces of the new data may include, when the number of pieces of the new data is greater than or equal to the reference number, performing an F-test and a T-test on the data used for generation of the machine learning model and the new data.

According to an embodiment, the determining of whether to apply the new data to the machine learning model using different methods according to the number of pieces of the new data may include excluding the new data from training of the machine learning model, when a result value obtained by performing the F-test and a result value obtained by performing the T-test are greater than or equal to a threshold value.

According to an embodiment, the determining of whether to apply the new data to the machine learning model using different methods according to the number of pieces of the new data may include determining whether to apply the new data to the machine learning model by performing bounds checking and a trend test with respect to the feature of the new data and the feature of the data used for generation of the machine learning model, when a result value obtained by performing the F-test and the T-test is less than a threshold value.

Advantageous Effects

With a machine learning training apparatus and an operating method thereof according to an embodiment disclosed herein, an error of a machine learning model may be reduced and a reliability of the machine learning model may be improved.

MODE FOR INVENTION

Figure 1:
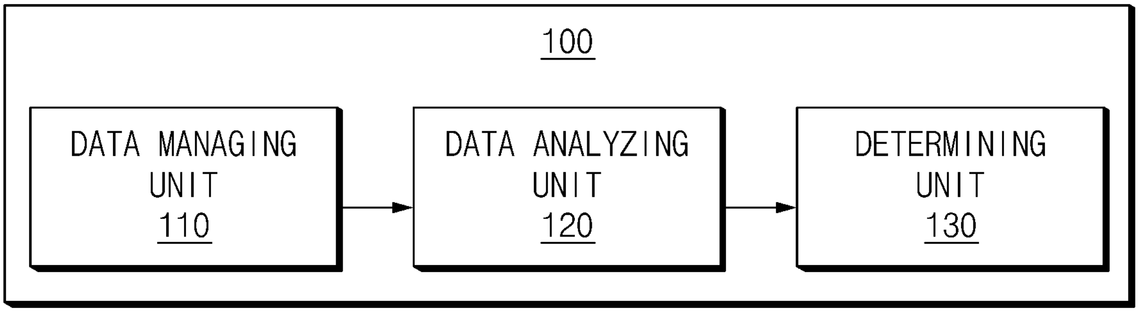
FIG. 1 is a block diagram of a machine learning training apparatus according to an embodiment disclosed herein.

Hereinafter, some embodiments disclosed in this document will be described in detail with reference to the exemplary drawings. In adding reference numerals to components of each drawing, it should be noted that the same components are given the same reference numerals even though they are indicated in different drawings. In addition, in describing the embodiments disclosed in this document, when it is determined that a detailed description of a related known configuration or function interferes with the understanding of an embodiment disclosed in this document, the detailed description thereof will be omitted.

To describe a component of an embodiment disclosed herein, terms such as first, second, A, B, (a), (b), etc., may be used. These term is used merely for distinguishing one component from another component and does not limit the component to the essence, sequence, order, etc., of the component. The terms used herein, including technical and scientific terms, have the same meanings as terms that are generally understood by those skilled in the art, as long as the terms are not differently defined. Generally, the terms defined in a generally used dictionary should be interpreted as having the same meanings as the contextual meanings of the relevant technology and should not be interpreted as having ideal or exaggerated meanings unless they are clearly defined in the present document.

FIG. 1 is a block diagram of a machine learning training apparatus according to an embodiment disclosed herein.

Referring to FIG. 1, a machine learning training apparatus 100 according to an embodiment disclosed herein may include a data managing unit 110, a data analyzing unit 120, and a determining unit 130.

The data managing unit 110 may manage data used for a machine learning model. The data managing unit 110 may store data (hereinafter, referred to as 'usage data') used for generation of the machine learning model. The data managing unit 110 may also collect new data to be input to the machine learning model. For example, usage data may be defined as a value that records a change in the amount of electricity from a discharge state of a certain battery cell among a plurality of battery cells to a full charge state of the certain battery cell or from the full charge state to the discharge state. For example, new data may be defined as a value that records a change in the amount of electricity from a discharge state of a battery cell that is different from the certain battery cell among the plurality of battery cells to a full charge state of the battery cell or from the full charge state to the discharge state.

In addition, for example, the usage data may be defined as a value that records a change in a voltage and/or a current of a certain battery cell among a plurality of battery cells, and the new data may be defined as a value that records a change in a voltage and/or a current of a battery cell that is different from the certain battery cell among the plurality of battery cells. Herein, the discharge state may include a case where a voltage of a battery is less than a reference value (e.g., a cut-off voltage).

The data analyzing unit 120 may extract features of the usage data and the new data. Herein, the feature may mean refer to individual and measurable experiential attribute found in time series data arranged at constant time intervals over time. For example, the feature may include a capacity of the battery. Herein, the capacity of the battery may mean the amount of electricity that may be stored in the battery, and capacity data of the battery may be calculated from the usage data and the new data.

The determining unit 130 may determine whether the number of pieces of the new data is less than a reference number. Herein, the reference number may be defined as a criterion for determining whether to treat the new data as one group or as individual pieces of data. For example, the determining unit 130 may treat the new data as individual pieces of data when the number of pieces of the new data is less than 10, and as one group when the number of pieces of the new data is greater than or equal to 10.

The determining unit 130 may determine whether to apply the new data to the machine learning model by using different methods according to the number of pieces of the new data. For example, the determining unit 130 may determine whether the new data is appropriate for being input to the machine learning model by comparison between groups, when the number of pieces of the new data is greater than or equal to the reference number. As such, by filtering new data that is not appropriate for being input to the machine learning model through comparison between a new data group and a usage data group, it is possible to reduce the number of additional tests for checking if the new data is appropriate as data to be individually input to the machine learning model.

That is, the determining unit 130 may perform an inter-group comparison test for the new data and the usage data, and perform an additional test regarding whether data satisfying a certain condition is appropriate as the data to be individually input to the machine learning model. The determining unit 130 may also perform a test for checking if each of the pieces of the new data is appropriate as the data to be individually input to the machine learning model.

The determining unit 130 may determine through such a test whether the new data is appropriate as representative data of a group to be determined through the machine learning model.

The determining unit 130 may exclude inappropriate data from a prediction process using the machine learning model. Thus, the determining unit 130 may reduce an error of the machine learning model and improve the reliability of the machine learning model.

The determining unit 130 may perform bounds checking and a trend test with respect to a feature of the new data and a feature of the usage data, when the number of pieces of the new data is less than the reference number.

The determining unit 130 may perform an F-test and a T-test with respect to the feature of the new data and the feature of the usage data, when the number of pieces of the new data is greater than or equal to the reference number.

Figure 2:
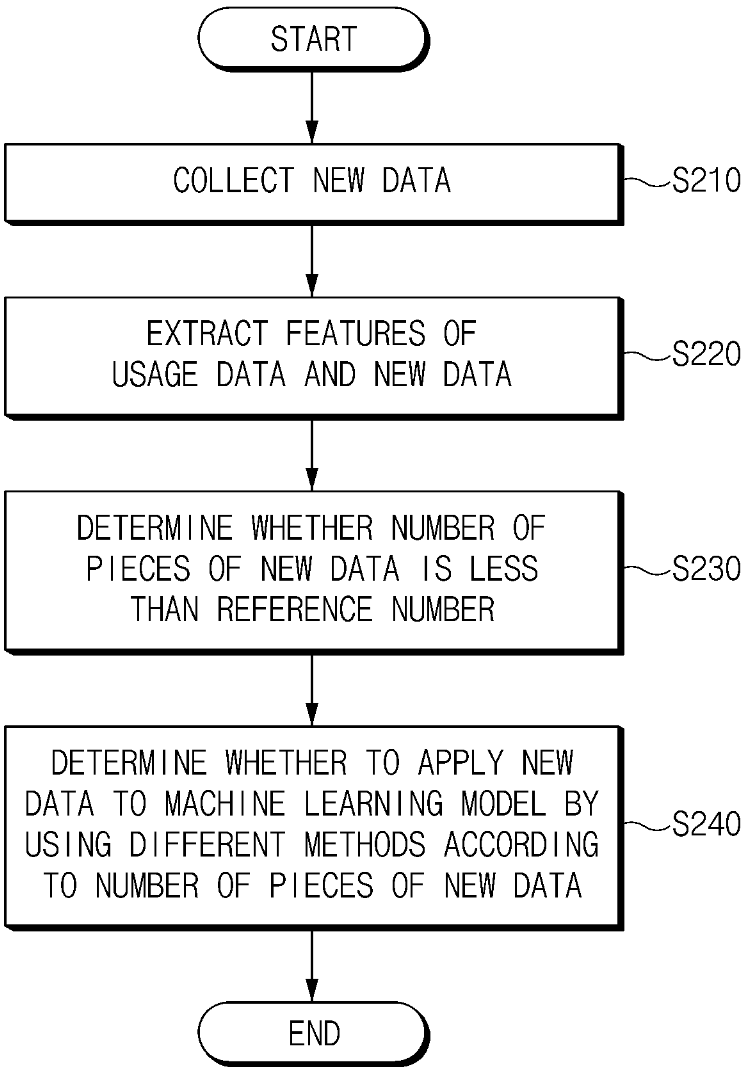
FIG. 2 is a flowchart showing an operating method of a machine learning training apparatus according to an embodiment disclosed herein.

FIG. 2 is a flowchart showing an operating method of a machine learning training apparatus according to an embodiment disclosed herein.

Referring to FIG. 2, the operating method of the machine learning training apparatus according to an embodiment disclosed herein may include operation S210 of collecting new data, operation S220 of extracting features of usage data and the new data, operation S230 of determining whether the number of pieces of the new data is less than a reference number, and operation S240 of determining whether to apply the new data to a machine learning model by using different methods according to the number of pieces of the new data.

Hereinbelow, operations S210 through S240 will be described in detail with reference to FIG. 1.

In operation S210, the data managing unit 110 may collect new data to be input to the machine learning model. For example, usage data may be defined as a value that records a change in the amount of electricity from a discharge state of a certain battery cell among a plurality of battery cells to a full charge state of the certain battery cell or from the full charge state to the discharge state. For example, new data may be defined as a value that records a change in the amount of electricity from a discharge state of a battery cell that is different from the certain battery cell among the plurality of battery cells to a full charge state of the battery cell or from the full charge state to the discharge state.

In addition, for example, the usage data may be defined as a value that records a change in a voltage and/or a current of a certain battery cell among a plurality of battery cells, and the new data may be defined as a value that records a change in a voltage and/or a current of a battery cell that is different from the certain battery cell among the plurality of battery cells. Herein, the discharge state may include a case where a voltage of a battery is less than a reference value (e.g., a cut-off voltage).

In operation S220, the data analyzing unit 120 may extract features of the usage data and the new data.

For example, the feature may include a capacity of the battery. Herein, the capacity of the battery may mean the amount of electricity that may be stored in the battery, and capacity data of the battery may be calculated from the usage data and the new data.

In operation S230, the determining unit 130 may determine whether the number of pieces of the new data is less than the reference number. Herein, the reference number may be defined as a criterion for determining whether to treat the new data as one group or as individual pieces of data. For example, in operation S230, the determining unit 130 may treat the new data as individual pieces of data when the number of pieces of the new data is less than 10, and as one group when the number of pieces of the new data is greater than or equal to 10.

In operation S240, the determining unit 130 may determine whether to apply the new data to the machine learning model by using different methods according to the number of pieces of the new data.

For example, in operation S240, the determining unit 130 may perform bounds checking and a trend test to determine whether the new data is appropriate as data to be input to the machine learning model, when the number of pieces of the new data is less than the reference number. In operation S240, the determining unit 130 may perform an F-test and a T-test to determine whether the new data is appropriate as data to be input to the machine learning model, when the number of pieces of the new data is greater than or equal to the reference number.

Figure 3:
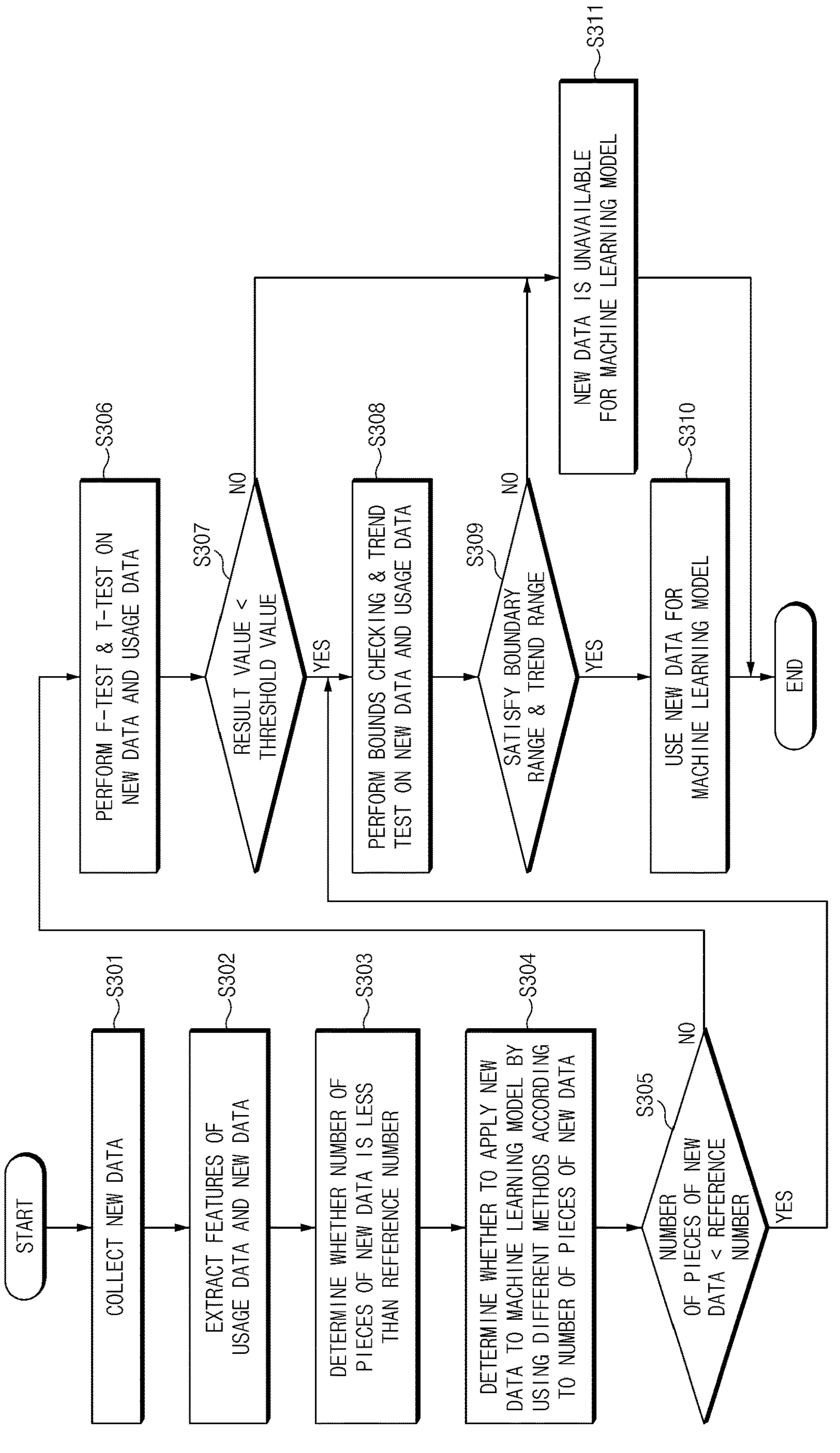
FIG. 3 is a flowchart showing an operating method of a machine learning training apparatus according to another embodiment disclosed herein.
Figure 4:
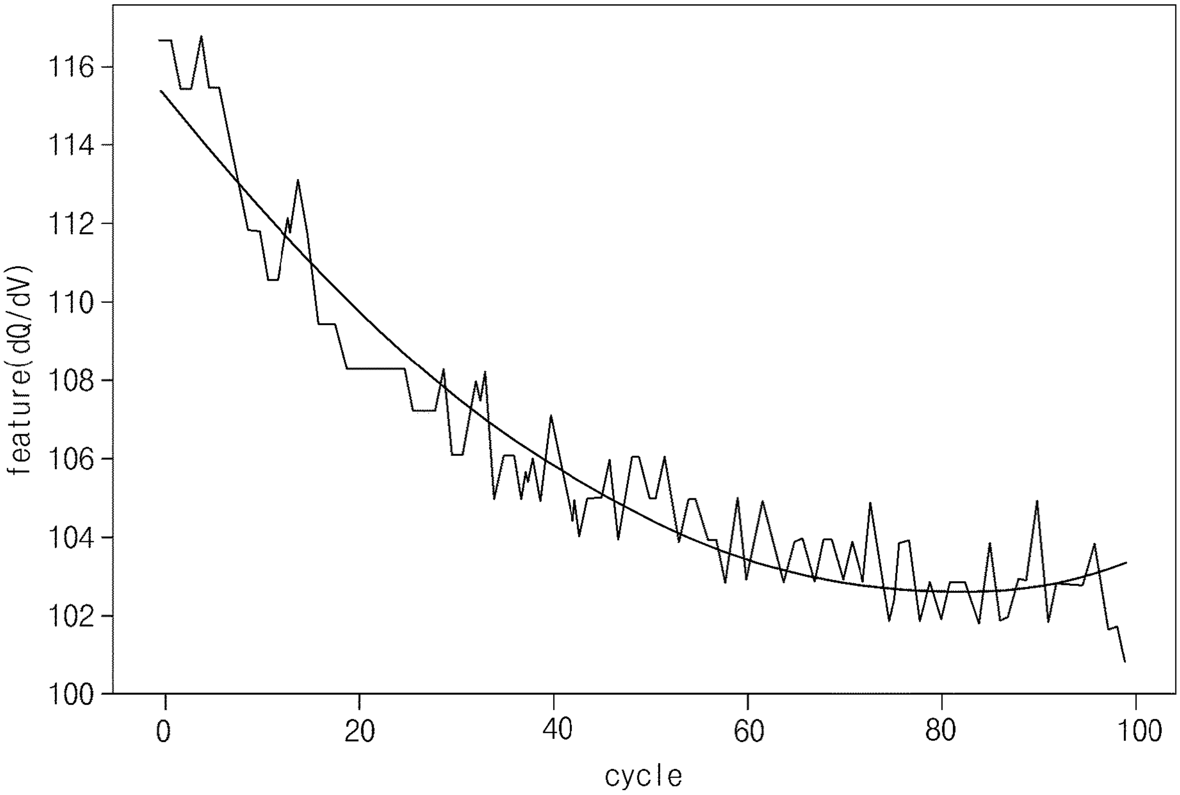
FIG. 4 is a graph showing a difference change in a feature of data used for generation of a machine learning model or new data over time, according to an embodiment disclosed herein.
Figure 5:
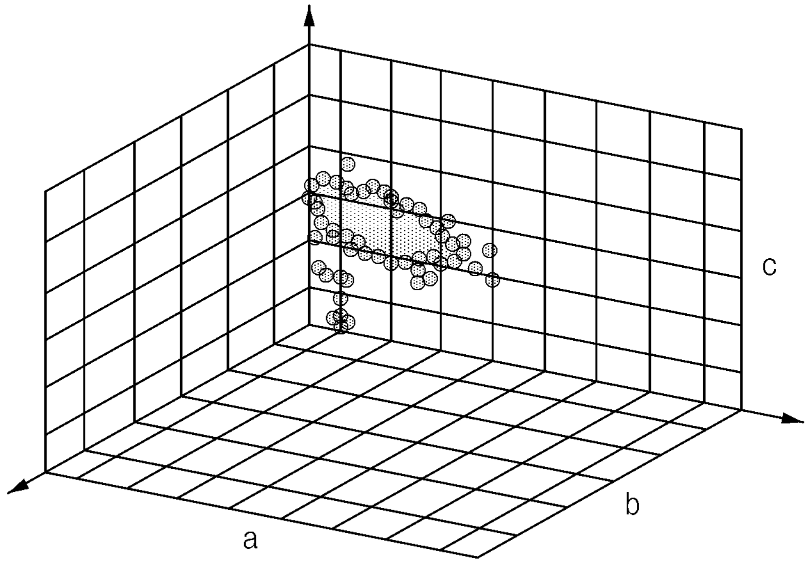
FIG. 5 is a graph showing linear term and constant term drift coefficient value obtained from a graph showing a change in a feature of data used for generation of a machine learning model, according to an embodiment disclosed herein.
Figure 6:
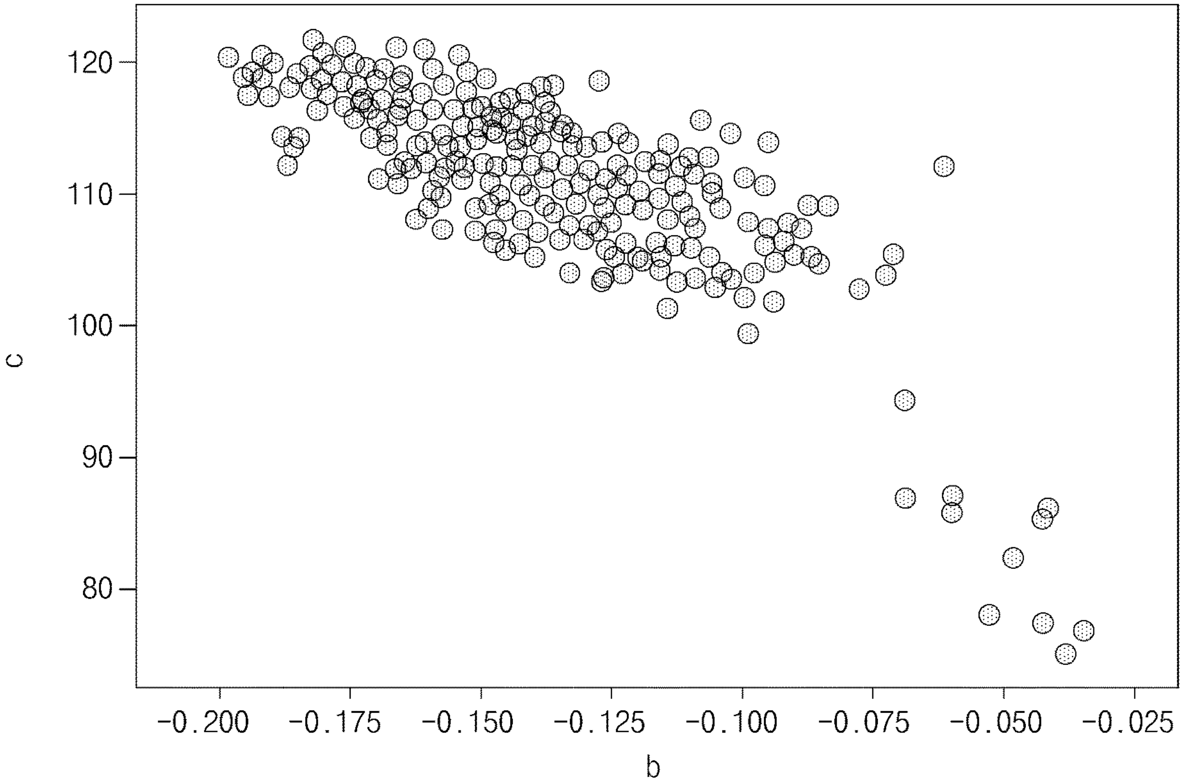
FIG. 6 is a three-dimensional (3D) graph showing a drift coefficient value obtained from a graph showing a change in a feature of data used for generation of a machine learning model, according to an embodiment disclosed herein.

FIG. 3 is a flowchart showing an operating method of a machine learning training apparatus according to another embodiment disclosed herein. FIG. 4 is a graph showing a in change in a feature of usage data or new data over time, according to an embodiment disclosed herein. FIG. 5 is a graph showing linear term and constant term drift coefficient value obtained from a graph showing a change in a feature of usage data, according to an embodiment disclosed herein. FIG. 6 is a three-dimensional (3D) graph showing a drift coefficient value obtained from a graph showing a change in a feature of usage data, according to an embodiment disclosed herein.

First, referring to FIG. 3, an operating method of a machine learning training apparatus according to an embodiment disclosed herein may include operation S301 of collecting new data, operation S302 of extracting features of usage data and new data, operation S303 of determining whether the number of pieces of new data is less than a reference number, operation S304 of determining whether to apply the new data to a machine learning model by using different methods according to the number of pieces of the new data, operation S305 of determining whether the number of pieces of the new data is less than or greater than or equal to the reference number, operation S306 of performing an F-test and a T-test on the usage data and the new data when the number of pieces of the new data is greater than or equal to the reference number, operation S307 of determining whether a result value obtained by performing the F-test and the T-test is less than a threshold value, operation S308 of performing bounds checking and a trend test with respect to a feature of the new data and a feature of the usage data, when the number of pieces of the new data is less than the reference number or the result value obtained by performing the F-test and the T-test is less than the threshold value, operation of S309 of determining whether the new data satisfies a boundary range or a trend range of the usage data as a result of the bounds checking and the trend test, operation S310 of using the new data for the machine learning model when the new data satisfies the boundary range and the trend range, and operation S311 of excluding the new data from training of the machine learning model when the result value obtained by performing the F-test or the T-test is greater than the threshold value or when the new data fails to satisfy the boundary range or the trend range of the usage data.

Hereinbelow, operations S301 through S311 will be described in detail with reference to FIG. 1.

In operation S301, the data managing unit 110 may collect new data to be input to the machine learning model.

In operation S302, the data analyzing unit 120 may extract features of the usage data and the new data.

In operation S303, the determining unit 130 may determine whether the number of pieces of the new data is less than the reference number.

In operation S304, the determining unit 130 may determine whether to apply the new data to the machine learning model by using different methods according to the number of pieces of the new data.

In operation S305, the determining unit 130 may determine whether the number of pieces of the new data is less than or greater than or equal to the reference number.

In operation S306, the determining unit 130 may perform the F-test and the T-test with respect to the new data and the usage data, when the number of pieces of the new data is greater than or equal to the reference number.

The F-test is a verification technique that verifies the statistical significance of a difference in variance between two groups at a statistically significant level.

Equation 1 may mean an equation for obtaining a variance difference between two groups through the F-test.

$$F\text{-test: } \frac{\sum (a - a \times \text{mean}(a))^2}{n_a - 1} \Bigg/ \frac{\sum (b - b \times \text{mean}(b))^2}{n_b - 1} \qquad \text{[Equation 1]}$$

In Equation 1, a indicates the feature of the new data. mean(a) indicates an average of features of the new data. $n_a$ indicates the number of features of the new data. b indicates the feature of the usage data. mean(b) indicates an average of features of the usage data. $n_b$ indicates the number of features of the usage data.

The T-test is a verification technique that verifies the statistical significance of a difference in mean between two groups at a statistically significant level.

Equation 2 may mean an equation for obtaining a mean difference between two groups through the T-test.

$$T\text{ test: } (\text{mean}(a) - \text{mean}(b)) \Bigg/ \left(\sqrt{\frac{1}{n_a} + \frac{1}{n_b}} \times \sqrt{\frac{(n_a - 1) \times \text{var}(a) + (n_b - 1) \times \text{var}(b)}{n_a + n_b - 2}}\right) \qquad \text{[Equation 2]}$$

In Equation 2, a indicates the feature of the new data. mean(a) indicates the average of the features of the new data. $n_a$ indicates the number of features of the new data. var(a) indicates a variance of the features of the new data. b indicates the feature of the usage data. mean(b) indicates an average of features of the usage data. $n_b$ indicates the number of features of the usage data. var(b) indicates a variance of the features of the usage data.

Statistical significance may be defined as a method by which a statistician determines whether his or her experimental results accidentally occur or are extreme that may not happen by chance. For example, when a P-value that is a result value of the F-test and the T-test is greater than or equal to the threshold value, the P-value may be determined to be meaningful, and when the P-value is less than the threshold value, the P-value may be determined to be meaningless.

In operation S307, the determining unit 130 may determine whether a result value obtained by performing the F-test and a result value obtained by performing the T-test are less than the threshold value. Herein, the threshold value may be defined as a criterion for determining 'abnormality' because an extreme result is output from the machine learning model. That is, the threshold value may be defined as a criterion indicating a degree to which data contradicts a particular statistical model. For example, the threshold value may be set to, but not limited to, 0.05, but is not limited thereto, and may be set slightly according to a statistically experimental result.

In operation S308, the determining unit 130 may perform bounds checking and a trend test with respect to the features of the new data and the usage data, when the result value obtained by performing the F-test and the result value obtained by performing the T-test are less than the threshold value.

In operation S308, the determining unit 130 may perform bounds checking and the trend test with respect to the feature of the new data and the feature of the data used for generation of the machine learning model, when the number of pieces of the new data is less than the reference number. Here, the bounds checking may include range checking for determining whether data exists in a particular range. For example, it may be individually determined for each piece of the new data whether a minimum value and a maximum value of the feature of the new data fall within a minimum and maximum range of the feature of the usage data. As a result of bounds checking, the determining unit 130 may determine that the new data satisfies the boundary range of the usage data when the minimum value and the maximum value of the feature of the new data fall within the minimum and maximum range of the feature of the usage data.

In the trend test, a trend may mean a gradual and continuous change of time series data for a long term. That is, the trend may mean a state of an upward trend or a downward trend in the time series data. For example, when charging, resting, discharging, and resting of a battery are referred to as a cycle, a gradual change in the capacity of the battery appearing as the cycle of the battery repeats may be referred to as the trend. The trend test may determine whether a coefficient of an equation obtained from the graph indicating the change in the feature of the new data falls within a range of a coefficient of an equation obtained from the graph indicating the change in the feature of the usage data.

The determining unit 130 may individually approximate the new data and the usage data by designating an X axis as time and a Y axis as a feature of data. The determining unit 130 may derive the graph as shown in FIG. 4 by approximating the usage data and the new data.

Referring to FIG. 4, a graph showing a feature of the battery (i.e., a capacity trend of the battery) appearing as the cycle of the battery repeats is shown. Here, the data may be the usage data or the new data.

The determining unit 130 may define a coefficient of a quadratic function equation obtained from the graph based on approximation, as a trend coefficient. A quadratic coefficient of the quadratic function equation may be indicated by a, a linear term coefficient may be indicated by b, and a constant term coefficient may be indicated by c.

Referring to FIG. 5, linear term and constant term coefficients obtained from the graph shown in FIG. 4 are shown.

Referring to FIG. 6, the determining unit 130 may show trend coefficients a, b, and c of the feature of the usage data in a 3D graph. The determining unit 130 may individually determine whether the trend coefficient of the feature of the new data falls within the range of the trend coefficient of the feature of the usage data shown in the 3D graph. As a result of the trend test, the determining unit 130 may determine that the trend range is satisfied when the trend coefficient of the feature of the new data falls within the range of the trend coefficient of the usage data.

Referring to FIG. 6, a 3D graph showing the trend coefficient of the usage data obtained from the graph showing the feature of the data (i.e., the capacity trend of the battery) appearing as the cycle of the battery repeats is shown.

Referring back to FIG. 3, in operation S309, as a result of bounds checking and the trend test, the determining unit 130 may determine whether the new data satisfies the boundary range and the trend range of the usage data.

In operation S310, the determining unit 130 may use the new data for the machine learning model when the new data satisfies both the boundary range and the trend range.

In operation S311, the determining unit 130 may exclude the new data from training of the machine learning model, when a result value obtained by performing the F-test and a result value obtained by performing the T-test are greater than or equal to the threshold value.

In operation S311, the determining unit 130 may exclude the new data from training of the machine learning model when the new data fails to satisfy the boundary range or the trend range of the usage data by performing the bounds checking and the trend test.

The above description is merely illustrative of the technical idea of the present disclosure, and various modifications and variations will be possible without departing from the essential characteristics of the present disclosure by those of ordinary skill in the art to which the present disclosure pertains.

Therefore, the embodiments disclosed in the present disclosure are intended for description rather than limitation of the technical spirit of the present disclosure and the scope of the technical spirit of the present disclosure is not limited by these embodiments. The protection scope of the present disclosure should be interpreted by the following claims, and all technical spirits within the same range should be understood to be included in the range of the present disclosure.

The invention claimed is:

1. A machine learning training apparatus, comprising:

a data managing unit configured to collect new data from a battery;

a data analyzing unit configured to extract a feature including capacity of the battery in relation to time series data of data used for generation of a machine learning model and a feature including the capacity of the battery in relation to the time series data of the new data; and a determining unit configured to:

treat the new data as individual pieces for bounds checking when a number of pieces is less than a reference, number and treat the new data as a data group in inter-group comparison when the number of pieces is greater than or equal to the reference number, so as to filter inappropriate data from a prediction process of the machine learning model, determine whether to apply the new data to the machine learning model using different methods according to the number of pieces of the new data based on the comparisons to the reference number, and use or exclude the new data in the machine learning model to reduce an error of the machine learning model and improve a reliability of the machine learning model based on the determination.

2. The machine learning training apparatus of claim 1, wherein when the number of pieces of the new data is less than the reference number, the determining unit determines whether to apply the new data to the machine learning model by performing bounds checking and a trend test with respect to the feature including the capacity of the battery in relation to the time series data of the new data and the feature including the capacity of the battery in relation to the time series data of the data used for the generation of the machine learning model.

3. The machine learning training apparatus of claim 2, wherein the trend test determines whether a coefficient of an equation obtained from a graph showing a change in the feature including the capacity of the battery in relation to the time series data of the new data over the time series data falls within a range of a coefficient of an equation obtained from a graph showing a change in the feature including the capacity of the battery in relation to the time series data of the data used for the generation of the machine learning model.

4. The machine learning training apparatus of claim 2, wherein the determining unit applies the new data to training of the machine learning model, when determining that the feature including the capacity of the battery in relation to the time series data of the new data falls within a trend range of the feature including the capacity of the battery in relation to the time series data of the data used for the generation of the machine learning model as a result of performing the trend test and determining that the feature including the capacity of the battery in relation to the time series data of the new data falls within a boundary range of the feature including the capacity of the battery in relation to the time series data of the data used for generation of the machine learning model as a result of the performing the bounds checking.

5. The machine learning training apparatus of claim 1, wherein when the number of pieces of the new data is greater than or equal to the reference number, the determining unit performs an F-test and a T-test on the data used for the generation of the machine learning model and the new data.

6. The machine learning training apparatus of claim 5, wherein the determining unit excludes the new data from training of the machine learning model, when a result value obtained by performing the F-test and a result value obtained by performing the T-test are greater than or equal to a threshold value.

7. The machine learning training apparatus of claim 5, wherein the determining unit determines whether to apply the new data to the machine learning model by performing bounds checking and a trend test with respect to the feature including capacity of the battery in relation to time series data of the new data and the feature including capacity of the battery in relation to time series data of the data used for the generation of the machine learning model, when a result value obtained by performing the F-test and the T-test is less than a threshold value.

8. The machine learning training apparatus of claim 7, wherein the determining unit applies the new data to training of the machine learning model, when determining that the feature of the new data falls within a trend range of the feature including capacity of the battery in relation to time series data of the data used for the generation of the machine learning model as a result of performing the trend test and determining that the feature including capacity of the battery in relation to time series data of the new data falls within a boundary range of the feature including capacity of the battery in relation to time series data of the data used for the generation of the machine learning model as a result of performing the bounds checking.

9. The machine learning training apparatus of claim 1, further comprising a machine learning model training unit configured to train the machine learning model by applying the new data to the machine learning model based on a determination result of the determining unit.

10. The machine learning apparatus of claim 1, wherein the determining unit is configured to derive a trend coefficient based on a three-dimensional graph, and apply the new data to the machine learning model when the trend coefficient falls within a trend range of usage data defined by drift coefficients a, b and c obtained from a quadratic function equation.

11. The machine learning training apparatus of claim 1, wherein the data managing unit stores usage data configured to be used to generate the machine learning model.

12. The machine learning training apparatus of claim 11, wherein the usage data stored in the data managing unit includes a change in an amount of electricity from a discharge state of a battery cell among a plurality of battery cells to a full charge state of the battery cell.

13. The machine learning training apparatus of claim 11, wherein the usage data stored in the data managing unit includes a change in a voltage and/or a current of a first battery cell among a plurality of battery cells, and wherein the new data includes a change in a voltage and/or a current of a second battery cell among the plurality of battery cells.

14. An operating method of a machine learning training apparatus, the operating method comprising:

collecting new data from a battery;

extracting a feature of data including capacity of the battery in relation to time series data used for generation of a machine learning model and a feature including the capacity of the battery in relation to the time series data of the new data;

treating the new data as individual pieces for bounds checking when the number of pieces is less than a reference number and treating the new data as a data group in inter-group comparison when the number of pieces is greater than or equal to the reference number, so as to filter inappropriate data from a prediction process of the machine learning model;

determining whether to apply the new data to the machine learning model using different methods according to the number of pieces of the new data based on the comparisons to the reference number; and using or excluding the new data in the machine learning model to reduce an error of the machine learning model and improve a reliability of the machine learning model based on the determining.

15. The operating method of claim 14, wherein the determining of whether to apply the new data to the machine learning model using different methods according to the number of pieces of the new data comprises:

when the number of pieces of the new data is less than the reference number, determining whether to apply the new data to the machine learning model by performing bounds checking and a trend test with respect to the feature including the capacity of the battery in relation to the time series data of the new data and the feature including the capacity of the battery in relation to the time series data of the data used for the generation of the machine learning model.

16. The operating method of claim 14, wherein the determining of whether to apply the new data to the machine learning model using different methods according to the number of pieces of the new data comprises:

when the number of pieces of the new data is greater than or equal to the reference number, performing an F-test and a T-test on the data used for generation of the machine learning model and the new data.

17. The operating method of claim 16, wherein the determining of whether to apply the new data to the machine learning model using different methods according to the number of pieces of the new data comprises:

excluding the new data from training of the machine learning model, when a result value obtained by performing the F-test or a result value obtained by performing the T-test are greater than or equal to a threshold value.

18. The operating method of claim 16, wherein the determining of whether to apply the new data to the machine learning model using different methods according to the number of pieces of the new data comprises:

determining whether to apply the new data to the machine learning model by performing bounds checking and a trend test with respect to the feature including the capacity of the battery in relation to the time series data of the new data and the feature including the capacity of the battery in relation to the time series data of the data used for the generation of the machine learning model, when a result value obtained by performing the F-test and the T-test is less than a threshold value.

19. The operating method of claim 14, further comprising:

deriving a trend coefficient based on a three-dimensional graph, and applying the new data to the machine learning model when the trend coefficient falls within a trend range of usage data defined by drift coefficients a, b and c obtained from a quadratic function equation.

* * * * *